United States Patent
Daniels et al.

(10) Patent No.: US 10,391,896 B1
(45) Date of Patent: Aug. 27, 2019

(54) BUS SEAT

(71) Applicant: Hickory Springs Manufacturing Company, Hickory, NC (US)

(72) Inventors: Danny Daniels, Hickory, NC (US); Thomas Rumler, Hickory, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 295 days.

(21) Appl. No.: 15/248,402

(22) Filed: Aug. 26, 2016

Related U.S. Application Data

(60) Provisional application No. 62/210,772, filed on Aug. 27, 2015.

(51) Int. Cl.
| | |
|---|---|
| *B60N 2/24* | (2006.01) |
| *B60N 2/01* | (2006.01) |
| *B60R 22/34* | (2006.01) |
| *B61D 33/00* | (2006.01) |
| *B64D 11/06* | (2006.01) |
| *B60N 2/30* | (2006.01) |

(52) U.S. Cl.
CPC .............. *B60N 2/242* (2013.01); *B60N 2/01* (2013.01); *B60N 2/3047* (2013.01); *B60R 22/34* (2013.01); *B61D 33/0007* (2013.01); *B64D 11/0639* (2014.12)

(58) Field of Classification Search
CPC ........ B60N 2/242; B60N 2/01; B60N 2/3047; A47C 7/626; A47C 7/62; B60R 22/34; B64D 11/0639; B61D 33/0007
USPC ........... 297/485, 250.1, 188.08, 236, 452.18, 297/188.12, 253, 188.06, 188.2
See application file for complete search history.

(56) References Cited

U.S. PATENT DOCUMENTS

| | | | | |
|---|---|---|---|---|
| 3,295,887 A | * | 1/1967 | Bacon .................. | B60N 2/6027 224/275 |
| 5,015,033 A | * | 5/1991 | Winters ................... | A47C 7/62 297/188.12 |
| 5,829,828 A | * | 11/1998 | Asfaw .................... | A47C 31/11 297/219.1 |
| 6,375,270 B1 | * | 4/2002 | Sullivan .................. | B60R 22/26 297/484 |
| 8,016,318 B2 | * | 9/2011 | Nezaki ................... | B60N 2/002 280/733 |
| 2013/0020847 A1 | * | 1/2013 | Smith .................... | B60N 2/688 297/228.13 |

FOREIGN PATENT DOCUMENTS

| | | | | |
|---|---|---|---|---|
| EP | 2556991 A1 | * | 2/2013 | ............... B60N 2/68 |
| GB | 2447708 A | * | 9/2008 | ........... B60N 2/2866 |

* cited by examiner

*Primary Examiner* — Milton Nelson, Jr.
(74) *Attorney, Agent, or Firm* — Perkins Coie LLP

(57) ABSTRACT

A bus seat is provided. The bus seat includes a backrest frame having a curve in part and a lumbar support coupled to the backrest frame by the curve. The bus seat also includes a horizontal seat that is pivotable from a seat position, where a seat frame is locked onto a base frame, to a stowed position. The bus seat is provided in a modular configuration to allow multiple backrests to be used for the bus seat. The backrests may include changeable seat belt configurations and child restraint system configurations. The bus seat also includes a seat belt retractor having a vertical configuration and a horizontal configuration for retracting and extending the seat belt.

11 Claims, 16 Drawing Sheets

BUS SEAT

CROSS-REFERENCE TO RELATED PATENT APPLICATIONS

The present application claims priority to U.S. Provisional Patent Application Ser. No. 62/210,772, filed Aug. 27, 2015, the disclosure of which is incorporated herein as if set out in full.

BACKGROUND

Bus seats, and in particular school bus seats, have been using the same technology for a number of years. Some of the reason for the relative stagnation of technological development of bus seats are the regulations for bus seats, such as those established in the United States by the National Highway Traffic Safety Administration, and other State agencies regarding the construction, configuration, and requirements of the bus seats. Additionally, the present technology generally works sufficiently satisfactorily that development of the technology has not been deemed as important for the industry.

While generally satisfactory for the purpose, conventional bus seats are relatively uncomfortable, unsightly, crowded, and the like. Thus, against this background, an improved bus seat is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a bus seat is provided. In one aspect, the bus seat is provided with a lumbar support in the back rest. In another aspect, the bus seat is provided with a concave rear facing seat frame and cover to provide improved spacing between seats. The bus seat may include a wire mesh frame core sandwiched between opposed foam or other energy absorbing material. In certain aspects, one or more of the lumbar support, concave rear facing seat frame and cover, and wire mesh combine to improve knee spacing, which may increase comfort. In certain aspects, one or more of the lumbar support, concave rear facing seat frame and cover, and wire mesh combine to optimize the angle of the backrest for the seat to improve seat spacing, which may increase comfort. The improved bus seat, in one or more embodiments, may be provided with an improved retractor for the seat belt of other webbing material. The improved retractor may comprise a modular design such that the retractor may be configured for a vertical or horizontal orientation. The bus seat may further include an integrated booster seat. In certain embodiments, the bus seat may include a child restraint including, in certain aspects, an integrated five (5) point harness. In certain aspects, the bus seat may have a horizontal seat that is hingedly connected to a support beam to allow pivotal motion of the horizontal seat from a down (or seat) position to an up (or stowed) position.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a bus seat. However, the technology described herein may be used for other vehicle seats including, in particular, vehicle bench seats such as, for example, those found on trains, boats and ships, airplanes, and the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
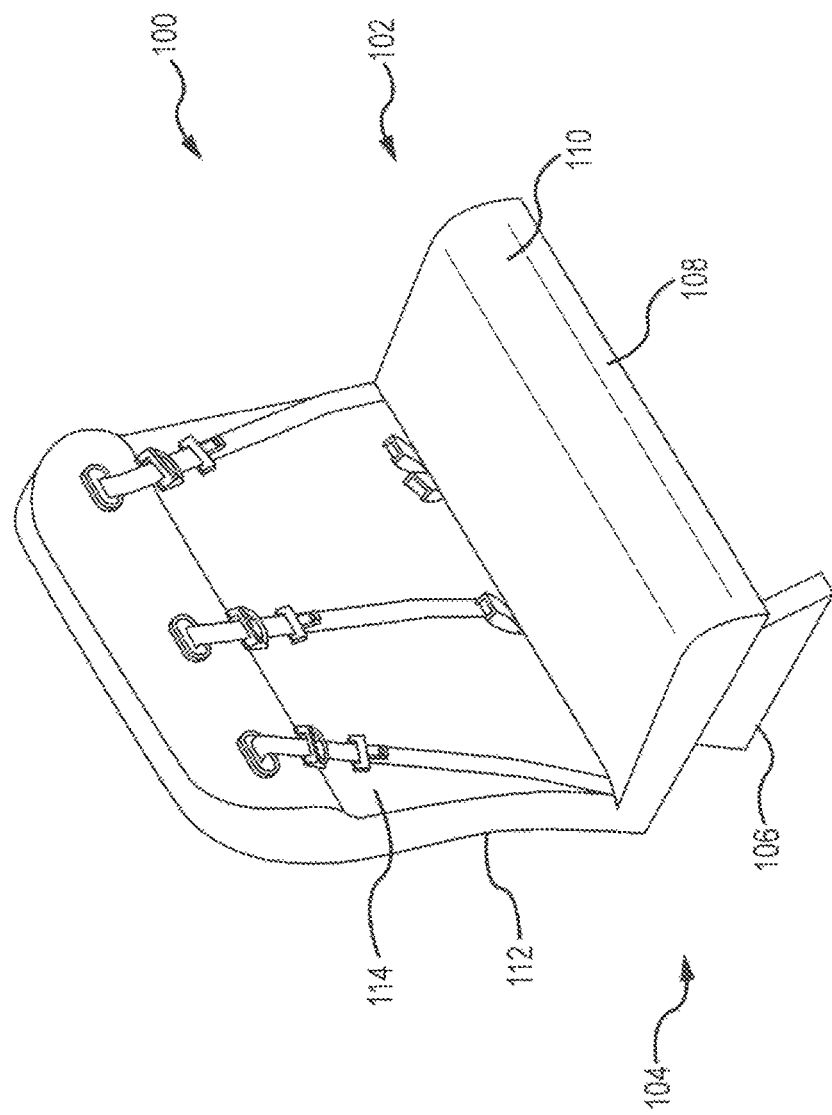
FIG. 1 is a front perspective view of a vehicle seat consistent with the technology of the present application.
Figure 2:
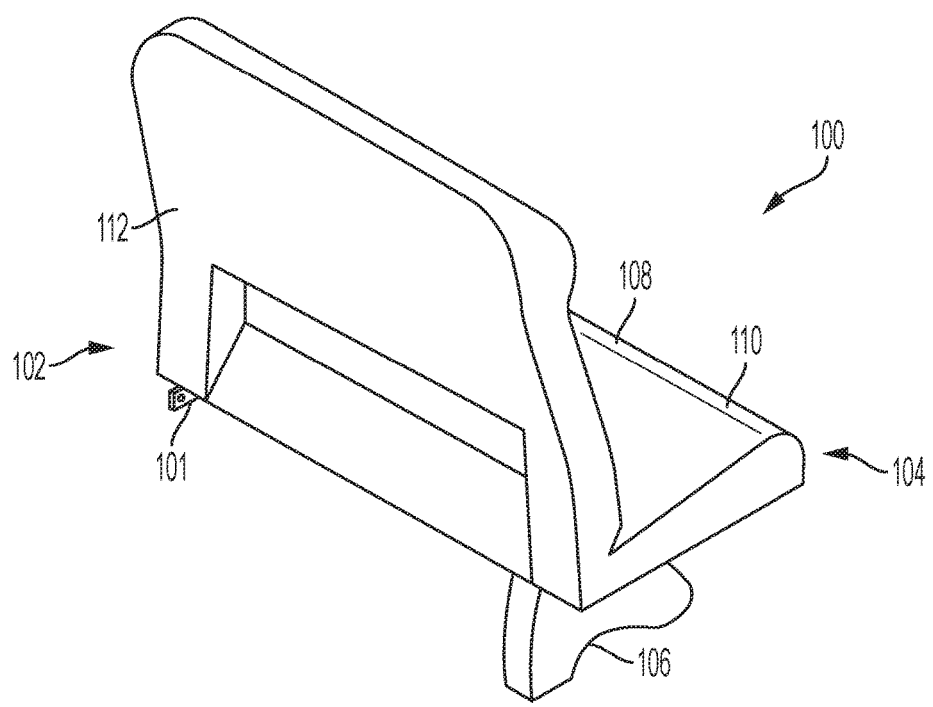
FIG. 2 is a rear perspective view of the vehicle seat shown in FIG. 1.

With reference now to FIGS. 1 and 2, front and back perspective views of a bus seat 100 consistent with the technology of the present application are provided. The bus seat 100 includes a vehicle wall side 102 and an aisle side 104. As can be appreciated, the vehicle wall side 102 of bus seat 100 can be attached to the wall; whereas, the aisle side 104 typically will incorporate a stand 106 of some type, such as the leg as shown. While only a single stand 106 is shown, multiple stands 106 may be used. Additionally, one or more stands 106 may be used rather than a bracket 101 (FIG. 2) to attach the bus seat 100 to the vehicle wall. The bus seat 100 further comprises a horizontal seat portion 108 having seat cushioning 110 and a generally vertical backrest portion 112 having backrest cushioning 114. The seat cushioning 110 and backrest cushioning 114 may include, among other things, one or more foams such as polyethylene or polyurethane foams to name but two types of foams.

Figure 3B:
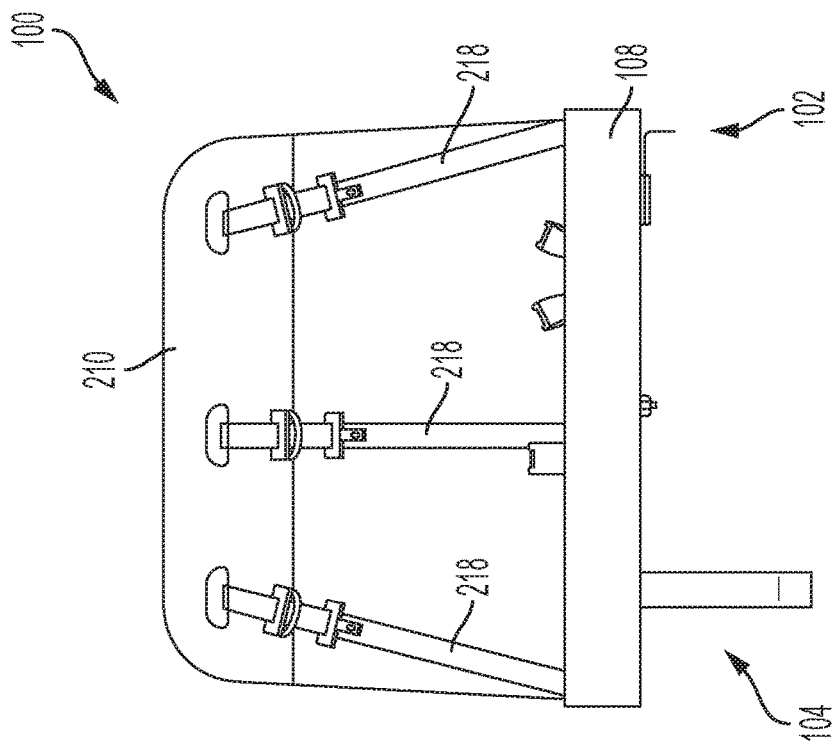
FIG. 3B is a front elevation view of the vehicle seat shown in FIG. 1.
Figure 3A:
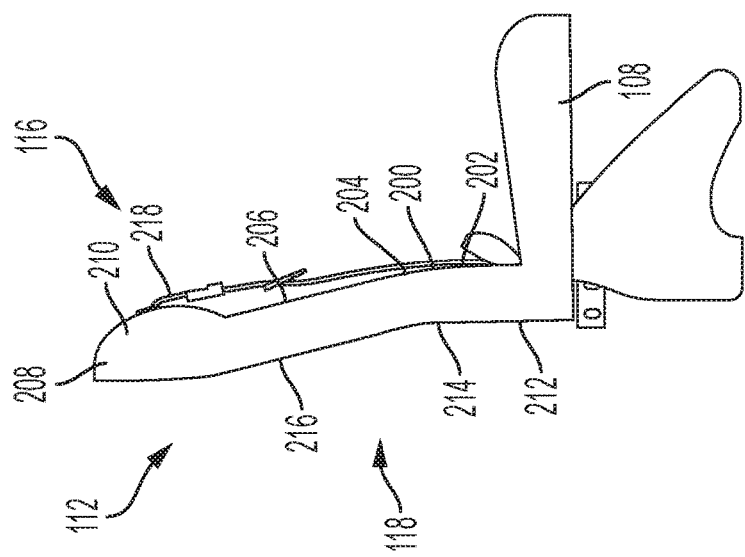
FIG. 3A is an aisle side elevation view of the vehicle seat shown in FIG. 1.

FIGS. 3A and 3B show side and front elevation views of the bus seat 100. As best seen in FIG. 3A, the generally vertical backrest portion 112 has a front facing side 116 and a rear facing side 118. The bus seat 100 includes a lumbar support 200. The lumbar support 200 generally causes the front facing side 116 of the backrest portion 112 to have a generally convex shape where the furthest forward portion of the backrest portion 112 is designed to conform to the general location of the lumbar spine in the typical passenger. In certain aspects, the bus seat 100 may include an adjustment mechanism to raise and lower the lumbar support 200 and/or extend forward or retract rearward the lumbar support 200. In some embodiments, the front facing side 116 will have a generally vertical portion 202 extending upwards from the horizontal seat portion 108. The generally vertical portion 202 transitions via a curvature 204 about lumbar support 200 to the canted vertical portion 206 that terminates in a head rest portion 208. The head rest portion 208 is formed from a head rest cushioning 210 that may be many conventional head rest shapes, but is shown generally cylindrical in the present embodiment. The head rest portion 208 generally extends forward of the canted vertical portion 206 at the top portion. While shown as generally flat, the vertical portion 202 and the canted vertical portion 206 may, in fact, have curvatures with a radius of curvature. The curvature is greatest about the curvature 204 (which corresponds to the smallest radius associated with the curve), which is configured to generally align with the lumbar spine of a typical passenger. The rear facing side 118 has a concave shape comprising a generally vertical portion 212, a curvature 214, and a canted vertical portion 216 that terminates at the head rest portion 208. The concave shape generally conforms to the convex shape. As shown in FIG. 3B, the exemplary bus seat 100 is generally designed as a bench seat having spacing for three (3) passengers as represented by shoulder and lap belts 218. The bench seat may have spacing for more or less passengers. As shown in FIG. 3B, the bus seat 100 has a bracket allowing the vehicle wall side 102 to be coupled to the vehicle wall in certain aspects. Alternatively, the bracket may be replaced with a stand 106.

Figure 4:
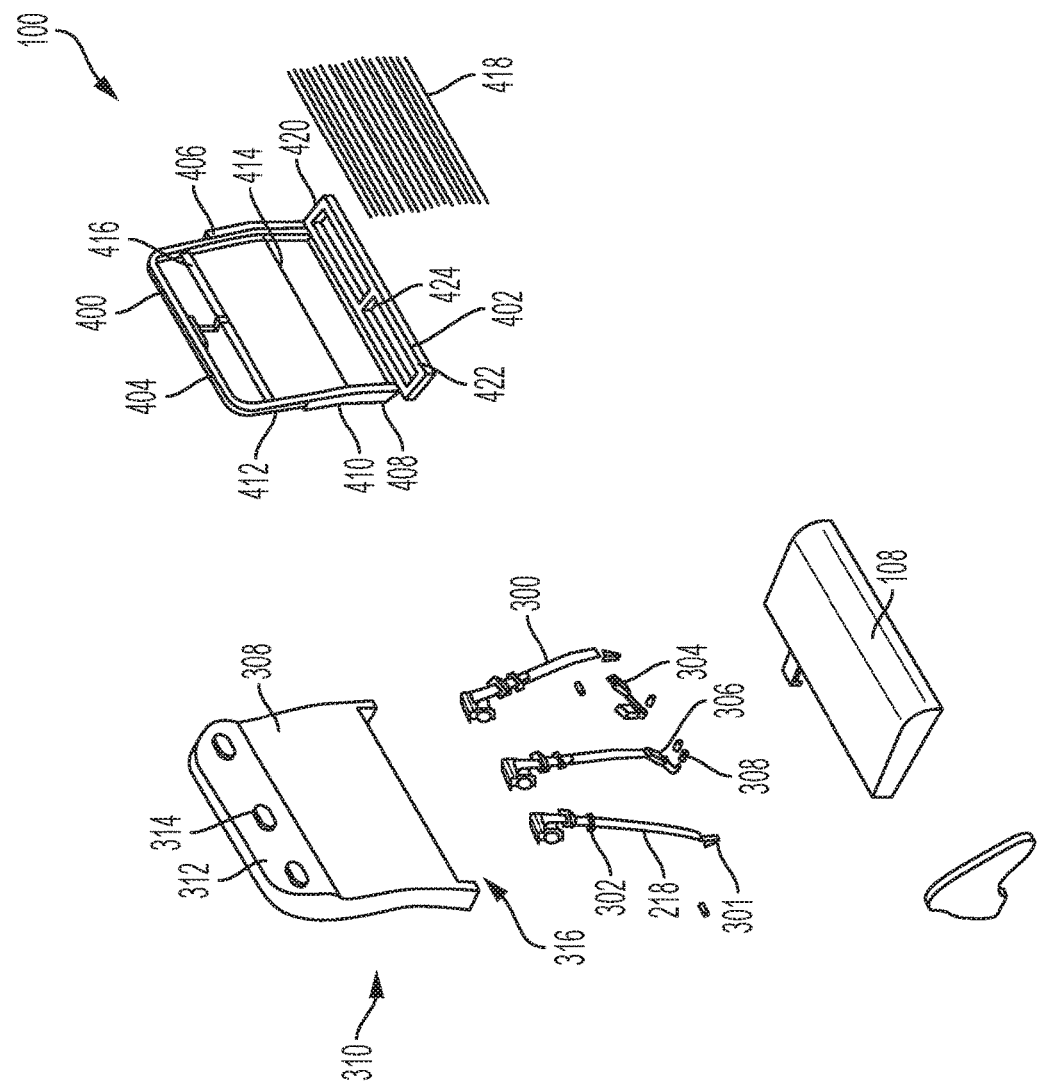
FIG. 4 is a partially exploded, front perspective view of the vehicle seat shown in FIG. 1.

FIG. 4 shows an exploded, front, perspective view of bus seat 100. Bus seat 100 includes a backrest frame 400 connected to a base frame 402. The backrest frame 400 comprises a tubular member structure having generally an inverted U shape (when viewed from the front or rear) with a top cross member 404 (generally extending through the head rest portion 208) and two vertical members 406. The vertical members 406 have a concave (rear facing)/convex (front facing) shape as described above, where the vertical members have a generally vertical portion 408, a curvature 410, and a generally canted portion 412 that terminates at the top cross member 404. The backrest frame 400 includes a lumbar member 414 coupled to each vertical member 406 at the curvature 410 and extending across the length of the bus seat 100. While not specifically shown, the lumbar member 414 may be movably coupled, as is generally known in the industry, to the backrest frame 400 to allow the lumbar member 414 to be adjusted. The backrest frame 400 also includes top mesh support members 416.

The backrest portion 112 of the bus seat 100 further includes a wire mesh 418 coupled at least to the vertical members 406 and the base frame 402 and extending over the lumbar member 414 on the front facing side 116 of the bus seat 100 to at least the top mesh support members 416. The top mesh support members 416 provide rigidity to the more pliable wire mesh 418 at the top or termination of the mesh support on the upper end. The wire mesh 418, in certain embodiments, may extend to the top cross member 404. The wire mesh 418 (sometimes referred to as a flex mat or wire mat) is a smaller gauge wire, such as, for example, a 14 gauge 0.75 inch thick zinc clear plated wire, that provides support for the backrest cushioning 114. The wire mesh 418 allows for more comfort with less foam cushioning than a conventional steel pan or other support member associated with conventional bus seats.

The base frame 402 includes panels 420 (one on the vehicle wall side and one on the aisle side) coupled together by horizontal rails 422 that extend between the panels 420. The base frame 402 further includes a central strut 424 coupling the horizontal rails 422 proximate midway point along the length of the bus seat 100. More or less struts are possible for strength. By way of reference, the horizontal rails 422 may be referred to as a front horizontal rail and a rear horizontal rail. The horizontal rails have anchors, such as threaded blocks, that are positionable along the rails. The stand 106 and bracket referred to above may be bolted to the anchors. As the anchors are movable along the rails, the stand 106 and brackets may be positioned as needed for optimal placement.

The bus seat has a plurality of shoulder and lap belts 218. Each shoulder and lap belt 218 has a belt 300 with a buckle 302. The belt 300 may be a webbing of nylon material or the like as is conventional. The belt 300 is coupled to a retractor, as will be explained below, and a D-ring 301 anchored to one of the horizontal rails 422. The buckles 302 are releasably connectable (in a conventional manner) to a buckle receiver 304. The buckle receiver 304 is generally coupled to a static belt 306 that is coupled to an anchor plate. The anchor plate is coupled to one of the horizontal rails 422 using a fastener 308, such as providing a threaded anchor on the rail 422 and a threaded bolt to couple the anchor plate to the rail 422.

Backrest cushioning 114 has a front facing portion 308, a rear facing portion 310, and a head rest portion 312. The belt 300 extends through a slot 314 in the head rest portion 312 in this exemplary configuration. The backrest cushioning 114 forms an envelope 316 that fits over the backrest frame 400 and wire mesh 418. The backrest cushioning 114 is closely formed with the wire mesh 418 to minimize the gap between the front facing portion 308 and the rear facing portion 310, partially forming the envelope 316.

Figure 5:
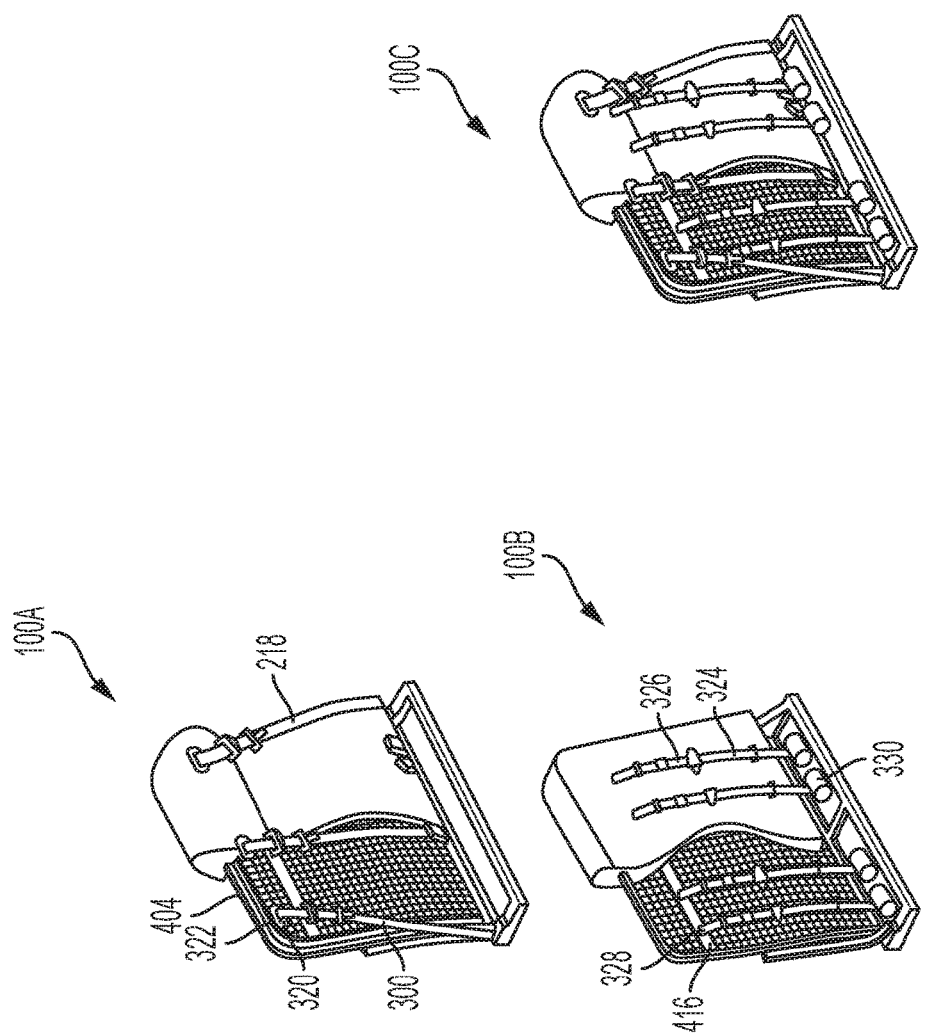
FIG. 5 is a view of the generally vertical backrest portion of the vehicle seat shown in FIG. 1 with different safety equipment configurations.

The technology of the present application provides a bus seat 100 that is configured to accept multiple safety equipment configurations. FIG. 5, for example, provides a cutaway perspective view of a bus seat 100A in with shoulder and lap belt 218 configurations. As shown, the belt 300 of the shoulder and lap belt 218 is coupled to a retractor 320. The retractor 320 is configured for a horizontal belt arrangement, which will be explained further below. The retractor 320 is coupled to a retractor mounting plate 322 that is coupled to the top cross member 404. In another exemplary configuration, a bus seat 100B is provided with a plurality of child harnesses 324. The harnesses 324 (sometimes referred to as a 5 point harness) comprise adjustable length belts 326 with anchors 328 at a first end of the belts 326 to couple to the top mesh support member 416. The second ends of the belt 326 may be coupled to a spring loaded spindle in a retractor 330. Each harness 324 generally comprises a snap buckle (or the like) to couple the left and right adjustable length belts 326 of the harness about the trunk of the child. As shown by a bus seat 100C, the bus seat 100C may be arranged with both shoulder and lap belts 218 and harnesses 324. A booster cushion (not specifically shown in FIG. 5) may be provided releasably coupled to, for example, the bottom of the horizontal seat portion 108 and releaseably coupled to the top of the horizontal seat portion. In such a case, the booster cushion may have hooks attached to straps to couple to the horizontal rail 422.

Figure 5A:
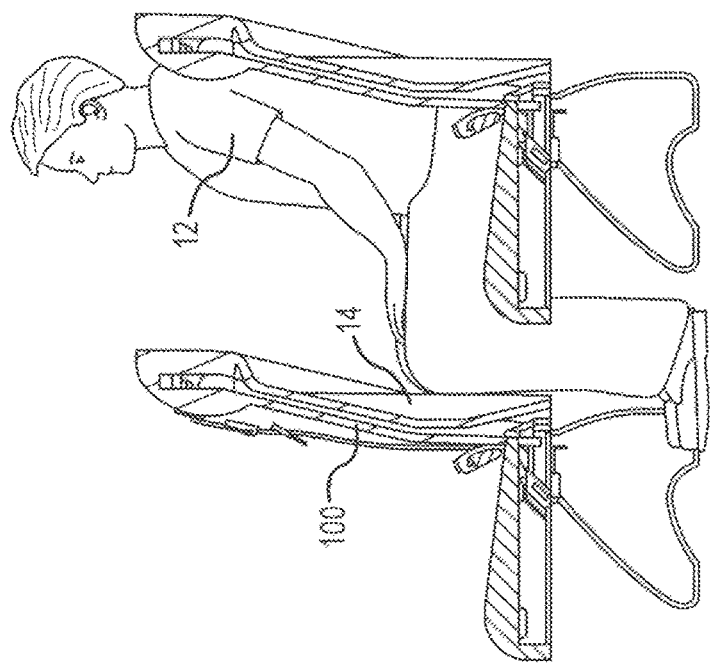
FIG. 5A is an exemplary rendition of the vehicle seat shown in FIG. 1 with an exemplary passenger comparing the technology of the present application with comparable conventional technology.
Figure 5A:
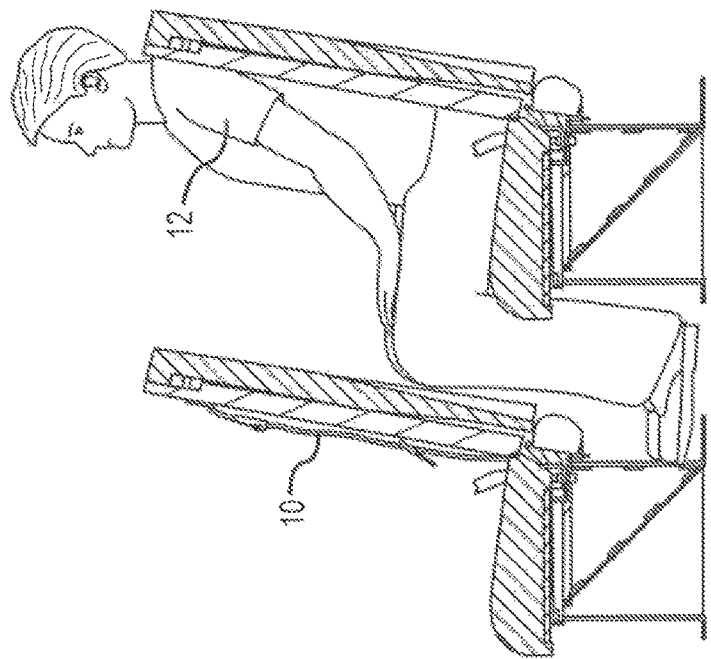

The bus seat 100 configurations, some of which are shown as bus seats 100A, 100B, and 100C, allow for certain practical benefits. For example, the modular design of the bus seat 100 allows for different horizontal seat portions 108 and different generally vertical backrest portions 112, some of which are shown above. This allows for the ability to easily and quickly exchange one generally vertical backrest with another. Also, in certain embodiments, the generally vertical backrest 112 is designed without a left or right hand orientation (e.g., the same generally vertical backrest 112 will work with the left or right side of a bus, for example. The design, in part due to the wire mesh 418, allows for removal of wood from the assembly, which should increase comfort. Finally, the concave (rear/facing) shape of the bus seat 100 provides an increase space for a passenger seated in the following seat as shown in FIG. 5A. A conventional bus seat 10 and a rendition of the bus seat 100, consistent with the technology of the present application, is shown in FIG. 5A. The passenger 12 has an increased knee space area 14, which knee space area does not compromise any safety regulations. While some numbers for thicknesses and distances are provided, the numbers are exemplary in nature and should not be considered limiting.

Figure 6:
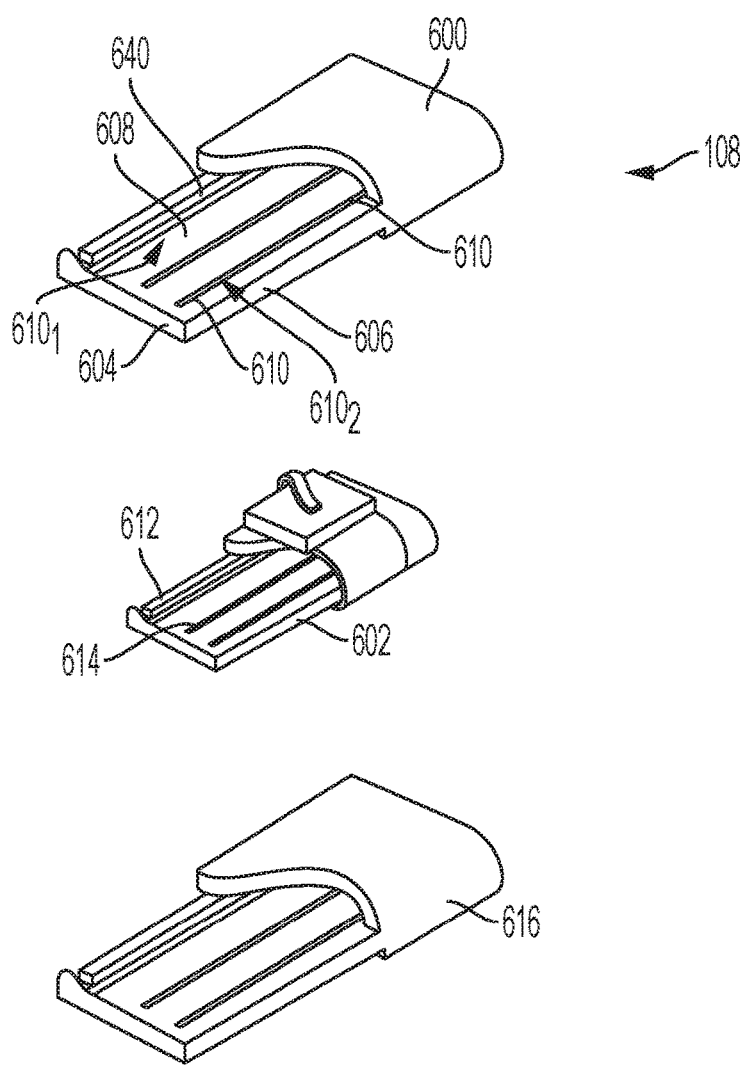
FIG. 6 is a view of the horizontal seat portion of the vehicle seat shown in FIG. 1 with different equipment configurations.

With reference now to FIG. 6, the horizontal seat portion 108 is shown in a partial cut-away view. The horizontal seat portion 108 has seat cushioning 110 on at least a top side 600 of the horizontal seat portion 108. The horizontal seat portion 108 is defined by a generally U shaped seat frame 602 comprising horizontal leg members 604 and a forward cross member 606 extending the length of the bus seat 100. A wire mesh 608 suspension is provided coupled to the frame 602, typically by resilient members 610, such as the shown coiled springs $610_1$ with hooks shown coupling the wire mesh 608 to the forward cross member 606 or the flexible members $610_2$, which may be metal or composite material, shown coupling the wire mesh 608 to the seat portion base frame anchor 612. Similar to the above, the wire mesh 608 may provide more comfort using less foam than conventional seats that have conventional supports, which are typically wood, such as plywood, to support the foam. The horizontal seat portion 108 may have one or more support members 614 extending along the wire mesh 608 for support. As can be appreciated, the seat cushioning 110 may be thicker towards the forward cross member 606 to provide additional comfort in view of the relatively thick, stationary part.

Figure 7:
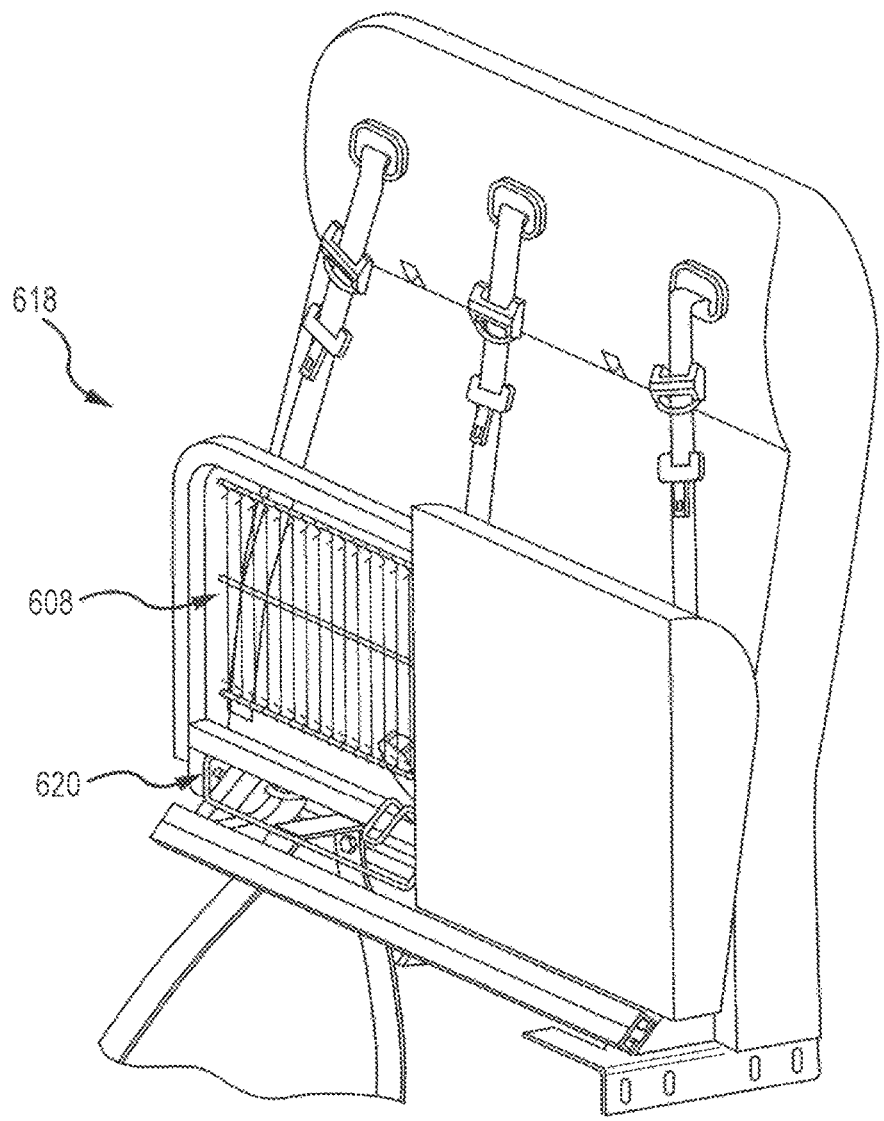
FIG. 7 is a view of the vehicle seat of FIG. 1 in an up (or stowed) position.
Figure 8:
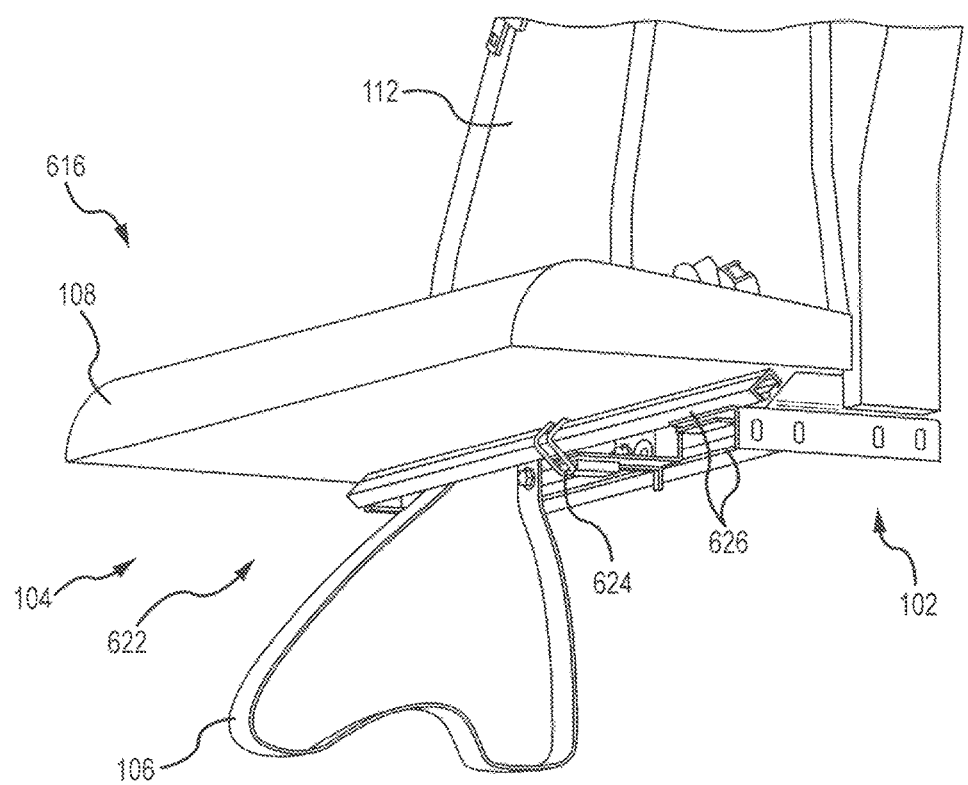
FIG. 8 is a view of the vehicle seat of FIG. 1 in a down (or seated) position.

The seat portion base frame anchor 612 is generally shaped to operatively engage at least one of the horizontal rails 422. The seat portion base frame anchor 612 may be coupled to the horizontal rails 422 using fasteners 308 as described in part above. The generally U-shaped seat frame 602 may be pivotally coupled to either (or both) of the seat portion base frame anchor 612 or the base frame 402 to allow the generally U-shaped seat frame 602 to pivot into a down (or seat) position 616 and an up (or stowed) position 618 (FIG. 7). In one exemplary embodiment, the horizontal seat portion 108 is coupled to the base frame 402 using a hinge 620, such as, for example, a torsion-adjusted hinge system. To facilitate pivoting of the frame, actuator, such as a gas spring or hydraulic piston, may be provided coupled between, for example, the stand 106 and a base of the horizontal seat portion 108. As shown in FIG. 8, the seat portion may comprise lock 622, such as a hook 624 to latch onto a rail 626 as shown, to facilitate maintaining the horizontal seat portion 108 in the down position 616.

As can be appreciated, the horizontal seat portion 108 having the up (or stowed) position in one aspect may facilitate practical maintenance and cleaning of the vehicle (bus, boat, train, or the like) as the horizontal seat portion 108 may be moved out of the way to some extent. Also, as with the generally vertical backrest portion 112, the horizontal seat portion in certain aspects are not specifically designed for the left or right (alternatively port and starboard) sides of the vehicle. Also, in certain aspects, horizontal seat portion 108 may be matched with different generally vertical backrest portions 112. The horizontal seat portion, at least in part due to the wire mesh 608, may be constructed without wood, which, in some embodiments, may increase comfort.

Figure 9:
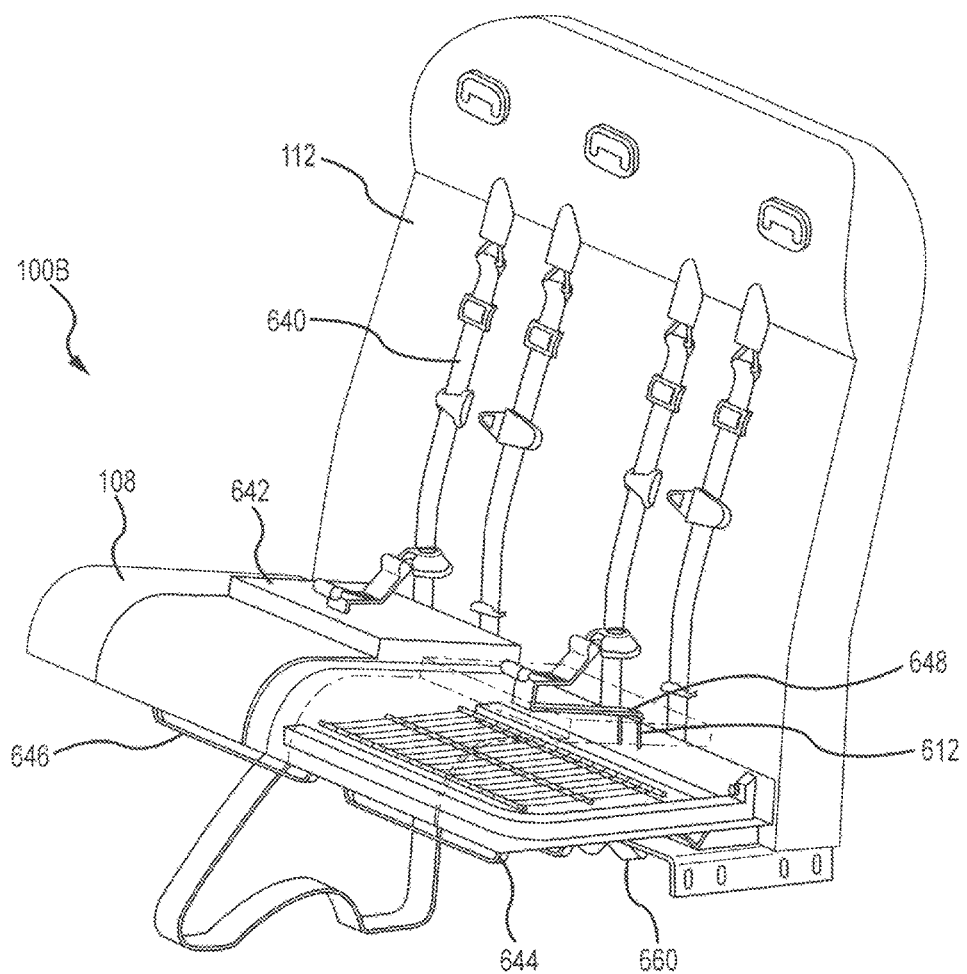
FIG. 9 is a view of the vehicle seat of FIG. 1 with a child restraint system wholly or partially incorporated consistent with the technology of the present application.
Figure 10:
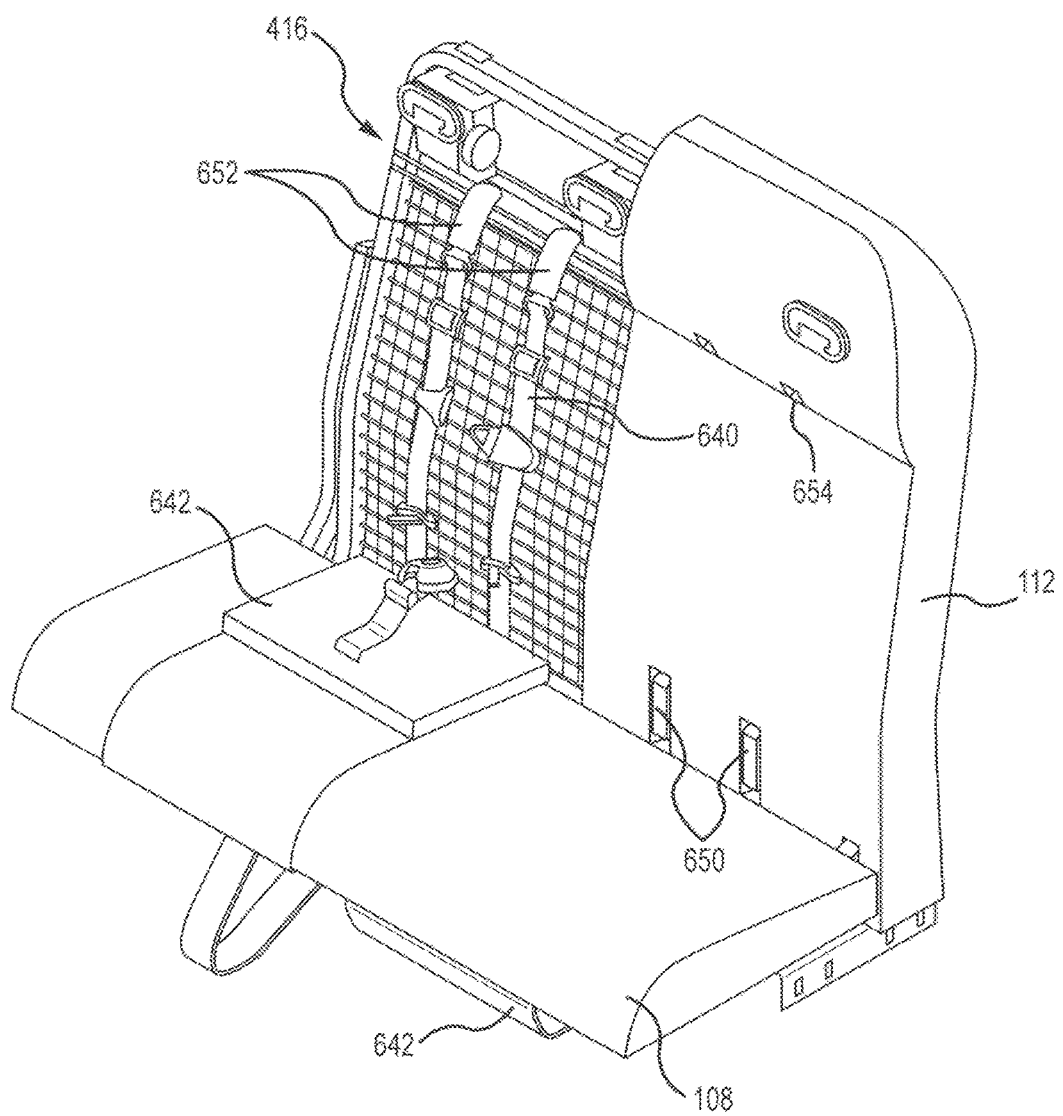
FIG. 10 is a view of the vehicle seat of FIG. 9.

As mentioned above with respect to FIG. 5 and bus seat configuration 100B (and 100C), the generally vertical backrest portion 112 may be provided with a child harness 640 as part of a child restraint system as shown in FIGS. 9 and 10. As shown in FIG. 9, which has a partial cut-away of the seat cushioning 110. The horizontal seat portion 108 has a booster seat 642 arranged in front of the child harness 640. The child restraint system includes, in certain embodiments, both the child harness 640 and booster seat 642. The booster seat, which may be formed of foam, springs, or other material, may be stored beneath the horizontal seat portion using a sleeve 644, which sleeve may comprise a sheet of material or one or more elastic members 646 as shown. The booster seat 642 may have bars on which one or more hooks or latches may be connected to anchor the booster seat 642. The hooks or latches may be coupled to a booster seat latch 648, which is a bar coupled to the base frame 402 or the base frame anchor 612 (as shown), possibly via a webbing material. As shown in FIG. 10, the generally vertical backrest portion 112 may comprise pockets 650, which may be slots, to hold the hooks or latches. Conversely, the hooks or latches may be coupled to the booster seat 642 and the pockets 650 may be passages to allow the hooks or latches to extend through the generally vertical backrest portion 112 to couple to the booster seat latch 648. The child harness 640 may include retractors 660 mounted to the bottom of the base frame 402, for example. The top end of the child harness 640 may have the straps coupled to hooks 652. The hooks 652 attach to the top mesh support member(s) 416. The top end of the child harness 640 is passed through passageways 654 to allow the hooks 652 to be operatively coupled to the top mesh support member(s) 416. In one exemplary use, the child harness is stored proximate the retractor 660 (between the generally vertical backrest portion 112 and the horizontal seat portion 108). Each strap of the child harness is extended and passed through passageway 654 such that the hooks couple to the top mesh support member 416. Thus, in this exemplary embodiment, the booster seat 642 and the child harness 640 may be stored when not in use.

Figure 11:
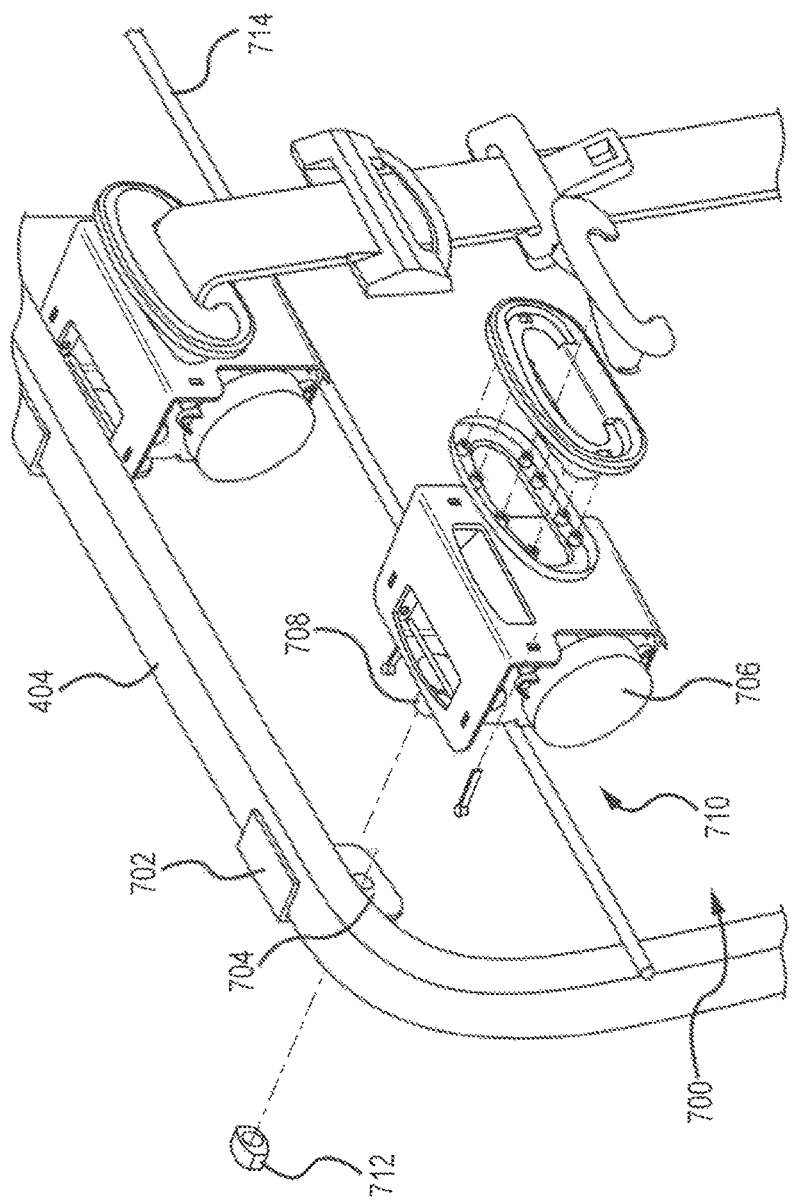
FIG. 11 is a front perspective, partially exploded, view of a belt retractor consistent with the technology of the present application.
Figure 12:
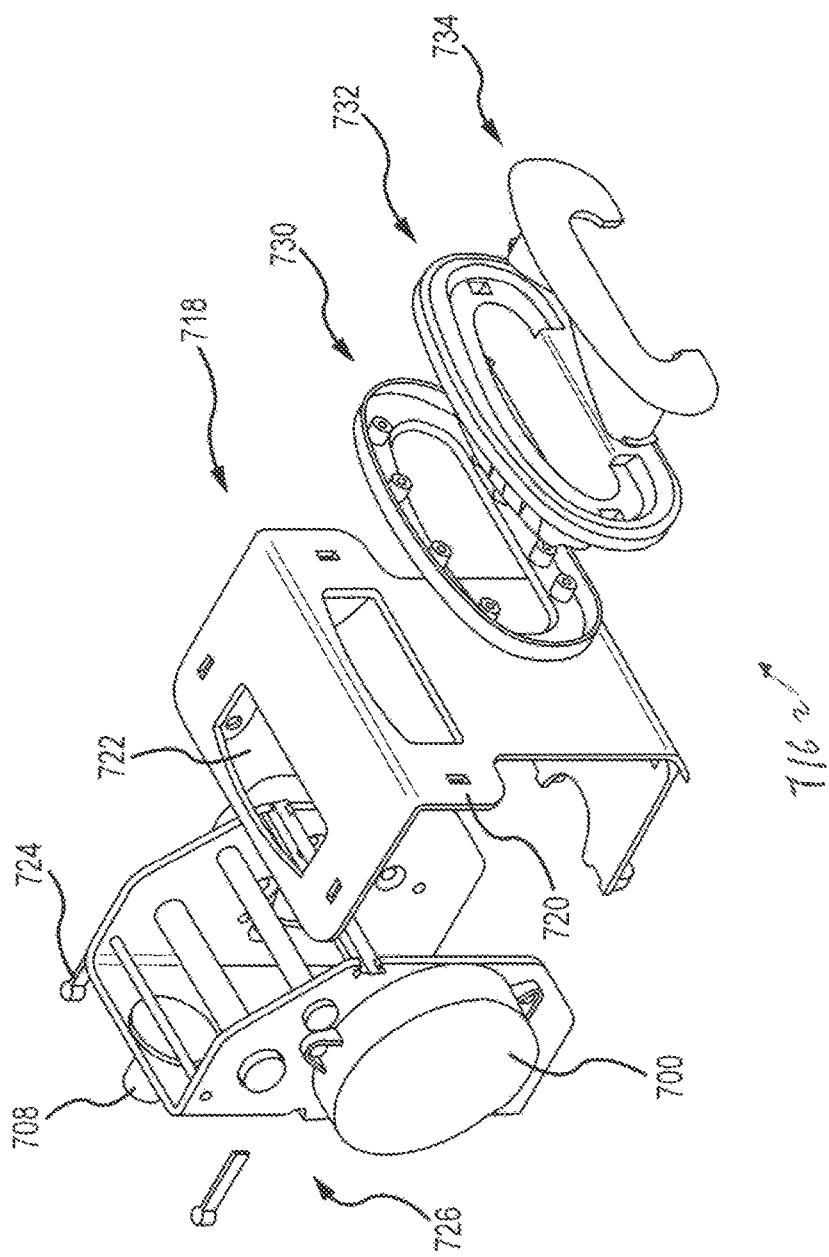
FIG. 12 is a perspective, exploded view of the retractor of FIG. 11.
Figure 13:
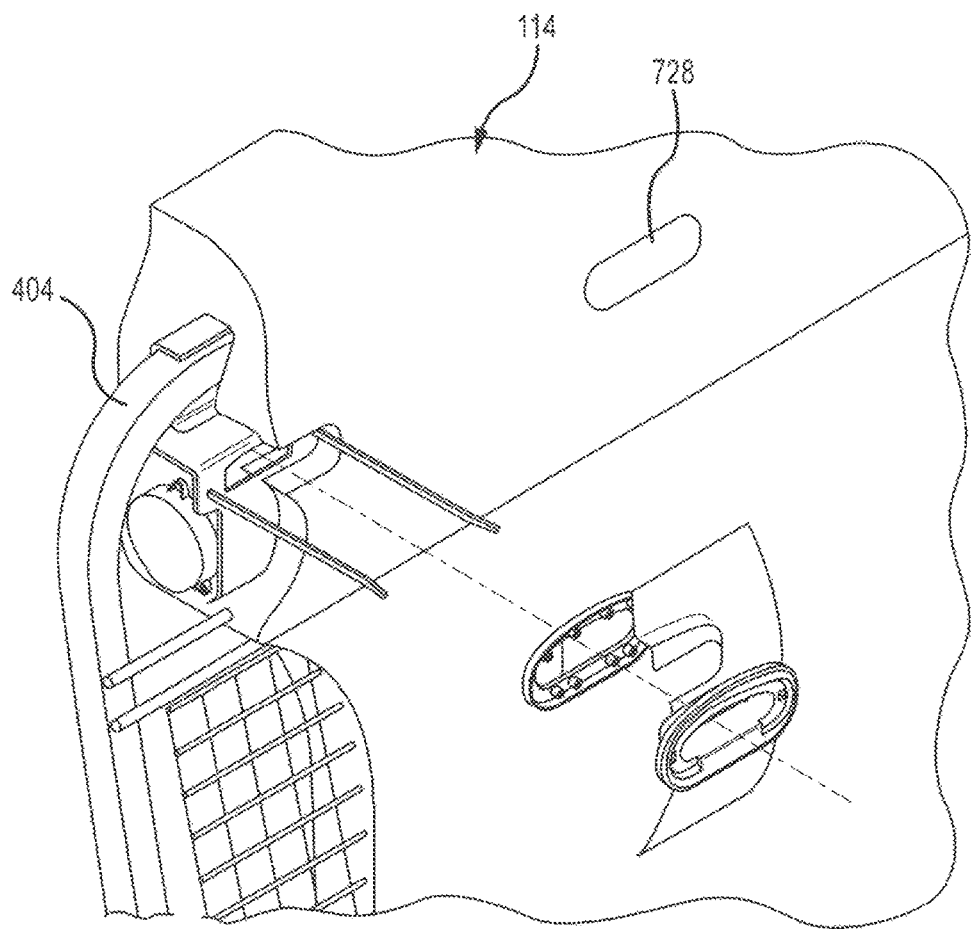
FIG. 13 is a view of the retractor of FIG. 12 incorporated into the vehicle seat of FIG. 1.

FIG. 11 shows the retractor 700 mentioned above coupled to the top cross member 404 of the bus seat 100. The reactor is coupled to the top cross member 404 with a baseplate 702 that has a bore 704. The retractor housing 706 has a protrusion 708 extending from a back 710 of the retractor housing 706. The protrusion 708, in this exemplary embodiment, may be threaded to receive a nut 712. The retractor 700 may be coupled to a member 714, which may be the top mesh support member or another member. FIG. 12 provides an exploded view of the retractor 700 in a first configuration 716, which may be referred to as the horizontal configuration 716. The retractor housing 706 is coupled to a retractor cover 718 having a horizontal opening 720 and a vertical opening 722. As shown in FIG. 13, the retractor housing 706 and retractor cover 718 are installed on the top cross member 404 under the cushioning 114. A grommet tab 724, which may be a flexible member, such as a plastic or wire, extends through slots 726 on the retractor housing 706 and the retractor cover 718 and through a belt opening 728 on the cushioning 114. A cover material keeper 730 is flush with the cushioning 114, which may, in certain examples, have a vinyl skin or leather exterior over, and coupled to the grommet tab 724 similar to the above. The vinyl skin, leather, or other exterior material 731 is captured between the cover material keeper and a grommet cover 732. Finally, the retractor 700 is finished with a grommet cap 734 coupled to the grommet cover 732.

Figure 14:
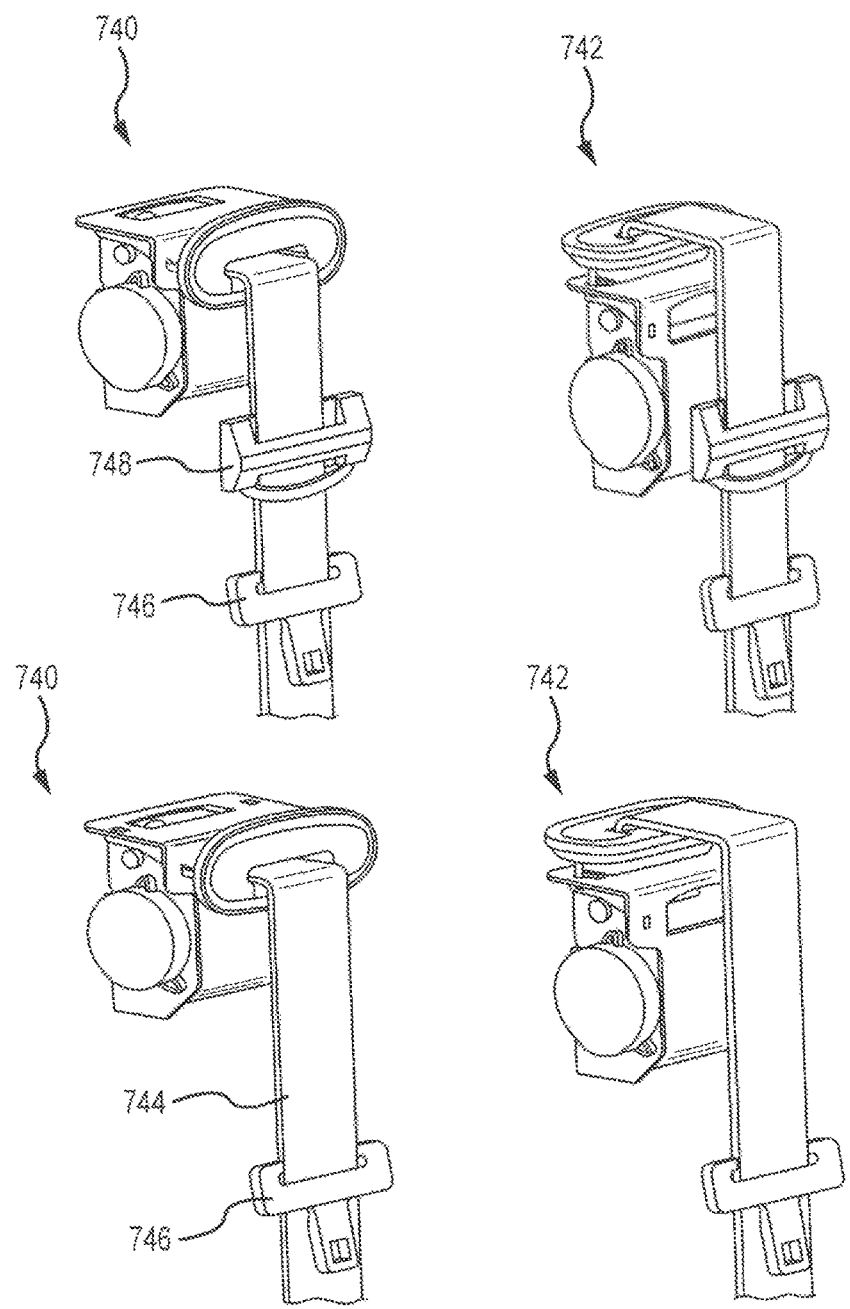
FIG. 14 is a view of possible configurations of the retractor of FIGS. 11-13.

As shown in FIGS. 12 and 13, the retractor cover 718 has a horizontal opening 720 and a vertical opening 722. This allows the same retractor 700 to be used with belt configurations having either of a forward 740 or top 742 arrangement on the vehicle seat as shown in FIG. 14. The belts 744 may be belts with a tongue 746 and with or without a shoulder adjustor 748.

Figure 15:
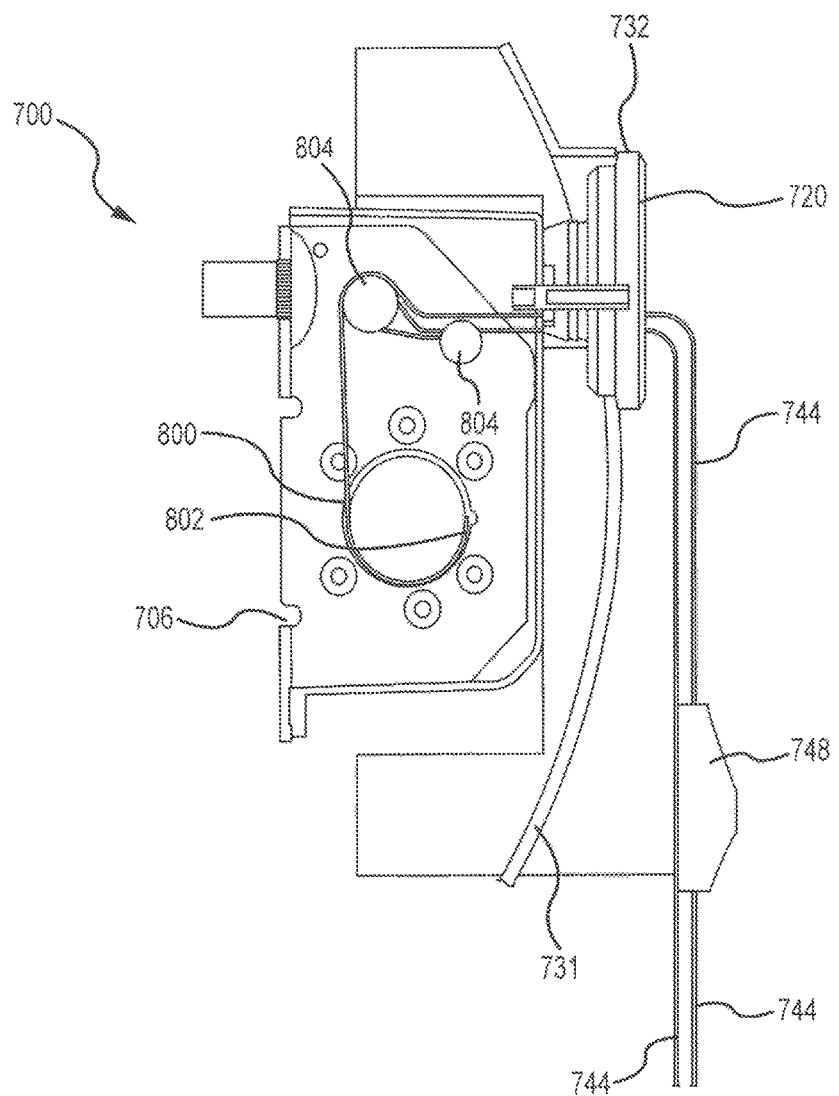
FIG. 15 is a side elevation, partially cut-away view of the retractor of FIGS. 11-14.

FIG. 15 shows a retractor 700 with a cut-way retractor housing 706 with the belt 744 in a forward 740 arrangement. The retractor housing 706 contains a conventional spindle 800 that may be spring loaded to provide tension to the belt 744. A first end 802 of the belt is attached to the spindle 800. The belt wraps around the spindle axle and extends to a diverter 804, which may be a stationary or rotating axle. The diverter allows the belt 744 to extend out the vertical opening 722 or the horizontal opening 720 of the retractor cover 718, which, in this case, the belt 744 extends out the horizontal opening 720. The belt 744 extends out the grommet cover 732 beyond the exterior material 731 and travels, in this exemplary embodiment, through a shoulder adjustor 748. The belt 744 would extend down the length of the generally vertical backrest portion 110 and loop through a D-ring (not shown in FIG. 15) and travel back up through the shoulder adjustor 748 and into the grommet cover 732. The belt 744 may be looped over the diverter 804 and the second end 806 (opposite the first end 802) is anchored in the retractor 700, which allows for removal of the unsightly static belts on conventional safety belt systems.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An apparatus in combination with a vehicle seat comprising:
   a backrest frame extending in a generally vertical direction having a backrest cushion on a front facing side of the backrest frame, the backrest cushion having a plurality of passages proximal a headrest portion of the backrest cushion wherein each of the plurality of passages extends from a front of the backrest cushion to the backrest frame;
   a seat frame having an aisle side and a wall side coupled to the backrest frame extending in a generally horizontal direction from the backrest frame having a seat cushion;
   a child restraint harness coupled to the vehicle seat, the child restraint harness comprising:
     an aisle side retractor and a wall side retractor,
     a vertical aisle side strap having a first end coupled to the aisle side retractor and a second end configured to extend through one of the plurality of passages in the backrest cushion and releasably couple to the backrest frame;
     a vertical wall side strap having a first end coupled to the wall side retractor and a second end configured to extend through one of the plurality of passages in the backrest cushion and releasably couple to the backrest frame; and
     a buckle to releasably couple the vertical aisle side strap to the vertical wall side strap wherein the second end of the vertical aisle side strap and the second end of the vertical wall side strap each terminate in a hook configured to releasably couple to the backrest frame.

2. The apparatus for the vehicle seat of claim 1 wherein the aisle side of the seat frame is coupled to a leg and the wall side of the seat frame is coupled to a bracket configured to be attached to a wall of the vehicle.

3. The apparatus for vehicle seat of claim 1 wherein a space between the backrest cushion and the seat cushion is sized to store the vertical aisle side strap and the vertical wall side strap when the second end of the vertical aisle side strap is disconnected from the backrest frame and vertical wall side strap is disconnected from the backrest frame.

4. The apparatus for vehicle seat of claim 1 comprising a booster seat on the seat cushion.

5. The apparatus for vehicle seat of claim 4 wherein the backrest cushions have a plurality of pockets extending through the backrest cushion and the booster seat comprises a fastener configured to extend through at least one of the plurality of pockets and is configured to releasably couple the booster seat to at least one of the backrest frame or the seat frame.

6. The apparatus for vehicle seat of claim 5 wherein the fastener is a hook.

7. The apparatus for vehicle seat of claim 5 wherein the fastener is a latch.

8. The apparatus for vehicle seat of claim 4 comprising a sleeve coupled to the vehicle seat wherein the sleeve is shaped to receive the booster seat.

9. The apparatus for vehicle seat of claim 8 wherein the sleeve comprises a plurality of elastic members.

10. The apparatus for vehicle seat of claim 8 wherein the sleeve is coupled to a bottom of the seat frame.

11. An apparatus for a vehicle seat comprising:
a base frame comprising an aisle side and a wall side, at least one stand coupled to the aisle side of the base frame;
a backrest frame operatively coupled to the base frame comprising a backrest cushion on a front facing side of the backrest frame, the backrest cushion comprising a plurality of passages proximal a headrest portion of the backrest cushion, the plurality of passages extending from a front surface of the backrest cushion to the backrest frame;
a seat frame operatively coupled to the base frame comprising a seat cushion and a sleeve coupled to the bottom of the seat frame;
a booster seat sized to be stored in the sleeve and movable from the sleeve to a position on the seat cushion;
a plurality of retractors operatively coupled to the base frame;
at least one storable child restraint harness, each of the at least one storable child restraint harness comprising:
a plurality of straps, each of the plurality of straps having a first end coupled to a corresponding one of the plurality of retractors and a second end terminating in a fastener wherein each of the straps are storable in a space between the backrest cushion and the seat cushion and vertically extendable from the space along the backrest cushion such that the fastener passes through one of the plurality of passages proximal the headrest portion of the backrest cushion to be releasably coupled to the backrest frame; and
a buckle to releasably couple corresponding pairs of the plurality of straps to form a 5-point harness.

* * * * *